United States Patent [19]

Abuyama

[11] Patent Number: 5,127,086
[45] Date of Patent: Jun. 30, 1992

[54] IMAGE FORMING APPARATUS

[75] Inventor: Yasuo Abuyama, Ebina, Japan

[73] Assignee: Kabushiki Kaisha Toshiba, Kawasaki, Japan

[21] Appl. No.: 677,425

[22] Filed: Mar. 29, 1991

[30] Foreign Application Priority Data

Mar. 30, 1990 [JP] Japan ................................ 2-84612

[51] Int. Cl.⁵ ............................................ G06K 15/00
[52] U.S. Cl. .................................... 395/109; 395/101; 355/35
[58] Field of Search .............................. 364/518–520, 364/235 MS File, 930 MS File; 355/35–38, 88, 32; 358/296, 80; 346/154, 157

[56] References Cited

U.S. PATENT DOCUMENTS

4,235,551 11/1980 Harvey .................................. 355/38

Primary Examiner—Arthur G. Evans
Attorney, Agent, or Firm—Foley & Lardner

[57] ABSTRACT

An printer apparatus is provided with keys which allow the easy correction of an operating mistake. When an operation mode requiring entry of a large number of commands or requiring a complicated key operation is established, the user may make an error in command entries. However, such an error can be easily corrected by operating the keys. Accordingly, the manipulation of the image-forming apparatus is easy, and the cost needed to produce copies can be reduced.

6 Claims, 8 Drawing Sheets

IMAGE FORMING APPARATUS

BACKGROUND OF THE INVENTION

1. Field of the Invention

The present invention relates to an image forming apparatus, and more particularly to a thermo-transfer type image forming apparatus which produces a copy of image information shown on a document by reading that image information and performing the thermo-transfer of dyeing materials (ink) of different colors onto the read image information medium.

2. Description of the Related Art

In general, a multicolored image forming apparatus includes: an image-reading section for reading image information, e.g., character and graphic data, shown on a document; an image-processing section for converting image information into electric signals in such a manner as to enhance the quality of the image such as sharpness, resolution, tone reproduction, color reproduction, and edge enhancement; an image-forming section for transferring the image information onto an image-bearing medium, i.e., a paper sheet or the like.

The image-reading section is provided with a control panel. A printing start signal, and printing condition-designating signals, such as a signal for designating the number of printing to be produced, a printing magnification signal, and a printing mode signal, are entered from the control panel. The image-reading section is also provided with a document table on which a document is mounted; an illuminating device for illuminating the document mounted on the document table; and a photoelectric conversion unit for converting the light reflected by the document into electric signals. The light reflected by the document represents the image information shown on the document.

The image-processing section is provided with a plurality of electric circuits and control units. For example, the image-processing section is provided with an image-processing circuit for supplying the electric signals obtained by the photoelectric conversion unit to the image-forming section as printing signals, and a main control unit for driving the image-processing circuit and controlling the operation of the entire image-forming apparatus.

The image-forming section is provided with a printing unit for transferring dyeing materials (ink) of different colors onto a paper sheet in accordance with the printing signals supplied from the image-processing section. The image-forming section is also provided with a material-delivering mechanism for delivering the paper sheet to the printing unit, and for discharging the paper sheet from the printing unit after the printing unit transfers the dye materials.

In the above multicolored image-forming apparatus, the image-reading section incorporates a color separation mechanism. This color separation mechanism is made up of optical elements (such as color separation filters of three types, corresponding to the three primary colors of light, focusing lenses, and folding mirrors); and an image-reading device constituted by a CCD sensor. After being read by the image-reading section, the image information shown on the document is converted into electric signals. These electric signals are supplied to the image-processing section as image signals.

In the image-processing section, the image signals are subjected to the image quality enhancement processing, such as intensity correction, edge correction and color correction, in units of each chromatic component. Then, the image signals are converted into color signals in units of each chromatic component, such that the color signals represent colors which are complementary to the colors of the images shown on the document. The color signals are binary-encoded or image-processed in a suitable method, such that tone information is added thereto. Thereafter, the color signals are supplied to the printing unit of the image-forming section as printing signals.

In the printing unit, a printing head corresponding to the printing signals is actuated and, therefore, transfers the ink from a dyeing material carrier to the paper sheet. The dyeing material carrier is moved through the region between the head and the paper sheet, and the paper sheet is maintained at the printing start position before the actuation of the head.

The transfer of ink from the dyeing material carrier to the paper sheet is repeated in accordance with the number of color signals supplied to the printing unit. Since different ink are superposed on the paper sheet, a multicolored image is formed on the paper sheet.

The image-forming apparatus of the above type is provided with various printing modes, such as a trimming mode wherein only a desired portion on a document is printed, a masking mode wherein an undesired portion is not printing, an edit mode wherein only a desired portion is printing onto that portion on a paper sheet which is designated by the user, and a photograph mode wherein halftone reproduction is improved.

The image-forming apparatus is also provided with an large number of keys on the control panel, in order for the user to enter various commands in accordance with the modes.

Since the image-forming apparatus has various modes and since the user has to enter various commands before starting a printing operation, it is likely that the user will make an error when entering the commands or following the printing-producing procedures. Even if the user becomes aware of an error, the user enter the commands associated with a selected mode. Alternatively, the user must cancel the operating mode and restart the entering of commands. In either case, the command entry is difficult to operate for the user.

Since a certain time is required before actually starting the copying operation, the image-forming apparatus does not ensure an efficient printing operation. In addition, since the command entry is difficult to operate for the user, the rate of operation of the image-forming apparatus is degraded, thus increasing the cost needed for producing printing. Further, the user may not make the most of the operating modes of the image-forming apparatus, due to the annoying command entry.

SUMMARY OF THE INVENTION

Accordingly, an object of the present invention is to provide an image-forming apparatus which can be easily set in a given operating mode and which produces copies in a short time and at low cost.

Another object of the present invention is to provide an image-forming apparatus which includes an input device allowing easy correction of an error.

To achieve these objects, the present invention provides an image forming apparatus for forming an image on an image bearing member, comprising means for inputting a plurality of operation data having first and second operation data in a predetermined order to form the image on the image bearing member, means for storing the operation data inputted by the inputting means, means for designating the correction of the first operation data when the inputting means input the second operation data which is inputted immediately after the first operation data by the inputting means in accordance with the predetermined order, means for reading the first operation data from the storing means response to the designating means, means for displaying the read first operation data, so as to correct the first operation data by means of the inputting means, and means for forming the image on the image bearing member based on the plurality of operation data stored by the storing means.

The image-forming apparatus of the present invention can be set in a desirable operating mode in response to simple command entry, even if that operating mode is a mode which, in the prior art, requires complicated command entries. In addition, the image-forming apparatus has keys which allow immediate and easy correction of an error. Even if the user makes an error when entering commands or in following printing-producing procedures, such an error can be easily corrected. Accordingly, the image-forming apparatus of the present invention can be easily manipulated.

Since the image-forming apparatus of the present invention can be set in a desirable operating mode in response to simple command entry and since an error, if occurs, can be easily corrected, a printing operation can be started in a comparatively short time. In addition, since the rate of operation of the image-forming apparatus is improved, the cost of producing a printed image can be lowered, accordingly. Further, since the procedures for establishing a given operating mode are simple, it is possible for the user to make the most of the operating modes of the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will now be described, with reference to the accompanying drawings.

Figure 1:
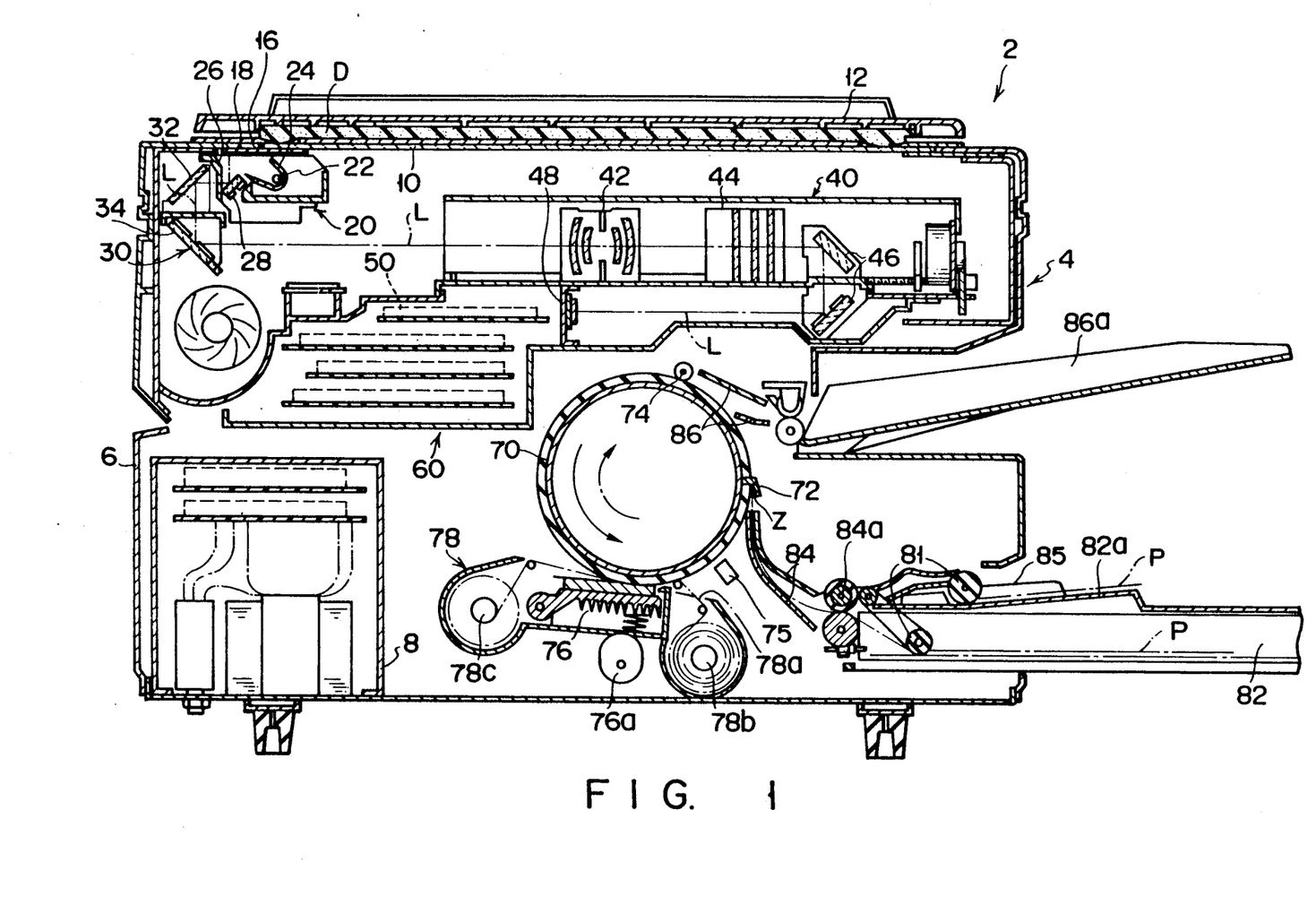
FIG. 1 is a sectional view of an image-forming apparatus according to an embodiment of the present invention.

Referring to FIG. 1, an image-forming apparatus 2 (a printer apparatus) includes an image-reading section 4 in the upper portion thereof. The image-reading section 4 includes a document table 10 on which an object or document D is mounted, and a document cover 12 which can cover the document D and press it against the document table 10. A size plate 16 is arranged at one end of the document table 10, so as to indicate the position at which the document D is mounted on the document table 10. A white plate 18, serving as an intensity reference plate, faces the size plate 16, with part of the document table 10 interposed therebetween. The white plate 18 is used as an intensity reference when the information shown on the document D is read.

The image-reading section 4 incorporates a first carriage 20, a second carriage 30, and a reading unit 40. By the first carriage 20, the light which is reflected by the document D mounted on the document table 10 and which therefore represents the information shown on the document D, is guided to an image-forming section 6. The image-forming section 6 will be detailed later.

The first and second carriages 20 and 30 are elongated in the main scanning direction. Likewise, a primary, a secondary and a tertiary mirrors 28, 32 and 34, a the lamp 22, reflectors 24 and 26 are elongated in the main scanning direction.

The first carriage 20 is made up of: the lamp 22 which illuminates the document D; reflectors 24 and 26 which converge the light emitted from the lamp 22 on the document D; and the primary mirror 28 which reflects the light reflected by the document D in a direction perpendicular to the main scanning direction.

The second carriage 30 is made up of: the secondary mirror 32 which bends the light reflected by the primary mirror 28 by 90°; the tertiary mirror 34 which further bends the light by 90°.

The first and second carriages 20 and 30 are arranged such that the longitudinal axes of the primary, secondary and tertiary mirrors 28, 32 and 34 are parallel to one another. The first and second carriages 20 and 30 are slidable along a sliding rail (not shown) in parallel to the document table 10, and can be reciprocated in a sub scanning direction perpendicular to the main scanning direction by a toothed belt or the like. The moving speed of the first carriage 20 is substantially twice as high as that of the second carriage 30.

The reading unit 40 is made up of: a lens 42 which converges the light bent by the tertiary mirror 34; a color separation filter 44 which decomposes the light passing through the lens 42 into components of the three major colors, namely, a red (R) component, a green (G) component and a blue (B) component; a folding mirror 46 which includes two mirrors arranged perpendicular to each other, adjusts the distance between the rear focal plane of the lens 42 and a photoconductor, and reflects the above reflected light in the predetermined direction; and a CCD sensor 48 which receives the light reflected by the folding mirror 46 and converts the light, i.e., reflected from the document D, into electric signals.

The lens 42 is arranged in a plane which is parallel to the longitudinal axis of the tertiary mirror 34 and through which the path of the light directed from the tertiary mirror 34 to the folding mirror 46 extends. The lens 42 can be moved by a lens motor (not shown), and not only converges the light directed to the folding mirror 46 but also changes the magnification of a reproduced image in accordance with the movement thereof.

The folding mirror 46 can be reciprocated in the sub scanning direction by a moving mechanism (not shown). The folding mirror 46 can correct displacement of the focal point of the lens 42, and reflects the light toward the CCD sensor 48.

As is shown in FIG. 1, the printer apparatus 2 includes an image-processing section 50 and a system controller 60. The image-processing section 50 converts an image signal S obtained by the CCD sensor 48 into a printing signal X, and its details will be detailed later. The system controller 60 controls the operation of the printer apparatus 2, and includes a printing controller (not shown) for permitting a copying operation to be performed accurately in accordance with the printing signal X.

Next, the image-forming section 6 will be described in detail.

As is shown in FIG. 1, the image-forming section 6 contains a printing drum 70, a printing head 76 and a ribbon cartridge 78.

The drum 70 has a circumferential surface formed of an elastic material, such as rubber, and holds a paper sheet P thereon. A gripper 72 for receiving the leading end of the paper sheet P is located at the position predetermined on the circumferential surface of the drum 70. A plurality of pressing rollers 74 are arranged around the drum 70, so as to press the paper sheet P against the drum. A gripper detector 75 is located in the vicinity of the drum 70, so as to detect the position of the gripper 72, i.e., leading end of the paper sheet P. A head-releasing mechanism 76a is located below the drum 70, so as to release the paper sheet P from the drum 70.

The head 76 is used for outputting the information shown on the document D (which information is read by the image-reading section 4 and is converted into printing signals X) to the paper sheet held on the drum 70.

The ribbon cartridge 78 is made up of: an ink ribbon 78a from which ink are supplied to the paper sheet P; a ribbon supply roller 78b around which the unused ink ribbon 78a is wound; and a ribbon take-up roller 78c around which the used ink ribbon 78a is wound.

The image-forming section 6 further contains a cassette 82, paper feed rollers 81, a paper guide 84, a stack bypass 85, and a paper outputting guide 86.

The cassette 82 is located in the region which is depicted in FIG. 1 as being the right side of the drum 70, and contains paper sheets P of a predetermined size. The paper feed rollers 81 takes the paper sheets P out of the cassette 82 one by one. The paper guide 84 includes a pair of delivering rollers 84a which convey the paper sheet P toward the drum 70, and defines a path through which the paper sheet P is guided to the drum 70. The stack bypass 85 is integrally formed with the cover 82a of the cassette 82, and is used for manually inserting the paper sheets P. The size of the paper sheets P inserted through the stack bypass 85 may be different from that of the paper sheets P contained inside the cassette 82. The outputting guide 86 guides the paper sheet P released from the drum 70 to the outside of the apparatus 2, and is provided with a tray 86a on which the paper sheets P discharged from the apparatus 2 are stacked.

The image-forming section 6 contains a power supply 8. From this power supply 8, the units and mechanisms incorporated inside the apparatus 2 are energized. The image-forming section 6 also contains a driving force transmission mechanism (not shown), such as the toothed belt mentioned above.

Figure 2:
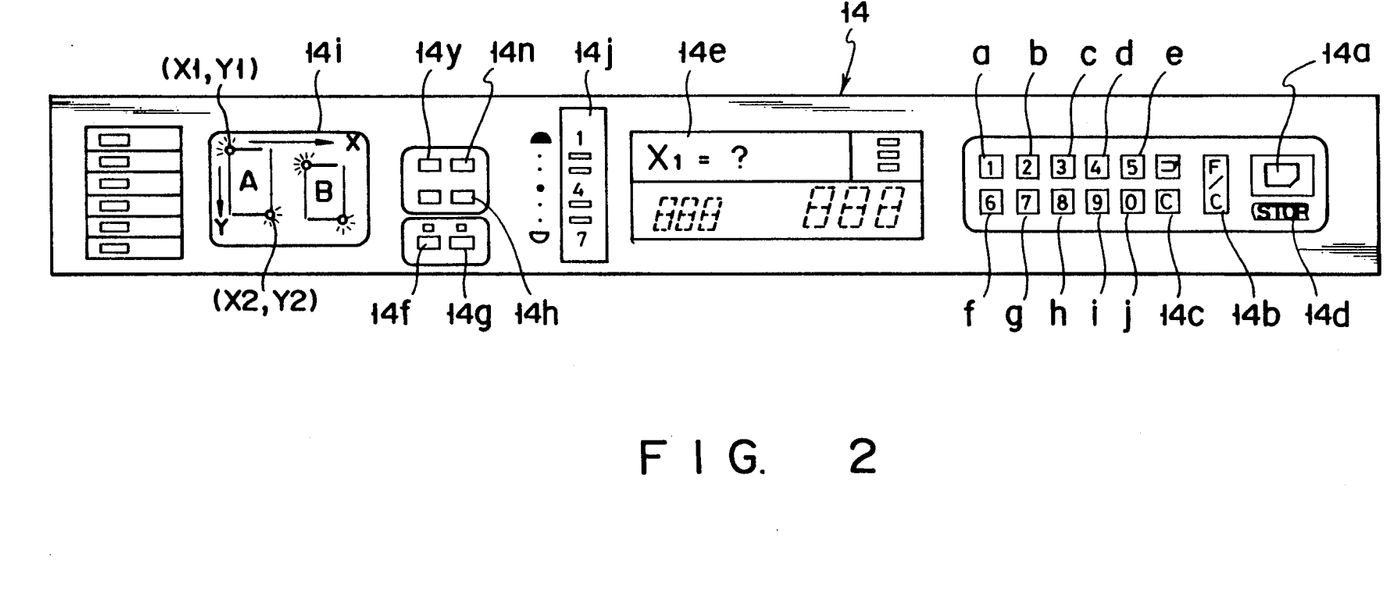
FIG. 2 is a perspective view of the control panel employed by the image-forming apparatus.

FIG. 2 is a front view of the control panel 14 of the printer apparatus 2. The control panel 14 is located in front of the document table 10, and is used for entering commands which designate copying conditions or signals which control the copying operation.

As is shown in FIG. 2, the control panel 14 has a print key 14a, a printing function clear key 14b, number keys a–j, a clear key 14c and a stop key 14d.

The print key 14a is used for entering a printing start signal. The printing function clear key 14b is used for entering a signal which temporarily cancels a mode-setting signal and which maintains a signal entered last. Number keys a–j correspond to "1", "2", . . . "8", "9" and "0", respectively, and are used for designating the number of printings to be produced or the magnification at which the printings to be produced. The clear key 14c is used for entering a signal which clears the numeral or data entered last and which maintains the state wherein the cleared numeral or data was entered. The stop key 14d is used for entering a signal which cancels the presently-set printing mode and printing conditions and which brings the apparatus 2 in a standby state.

The control panel 14 has a display device 14e. This display device 14e displays the data entered by the user, such as the number N of printing to be produced, the magnification ER at which the printing are produced, the size PS of printing sheets, the printing mode F, and the printing color TC. It also displays the operating condition of the apparatus 2; for example, it displays which paper supply source, cassette 82 or stack bypass 85, is selected and indicates the location of a paper jam.

Further, the control panel 14 has a masking mode key 14f, a trimming mode key 14g, an entry key 14h, a display 14i, a density adjuster 14j, and "YES" and "NO" keys 14y and 14n.

The masking mode key 14f is used for establishing a masking mode, wherein the user can designate a portion which is not to be printed. The trimming mode key 14g is used for establishing a trimming mode, wherein the user can designate a portion which is to be printed. The enter key, 14h is a confirmation key and is operated to enter the data which the user enters in association with the masking or trimming modes. The display 14i shows which area on the document D is designated by the user in the masking or trimming mode. The density adjuster 14j is used for adjusting the ink density of a printing to be produced. The "YES" and "NO" keys 14y and 14n are operated when the message which the apparatus 2 displays in association with the masking or trimming mode requires a Yes or No answer.

Figure 3:
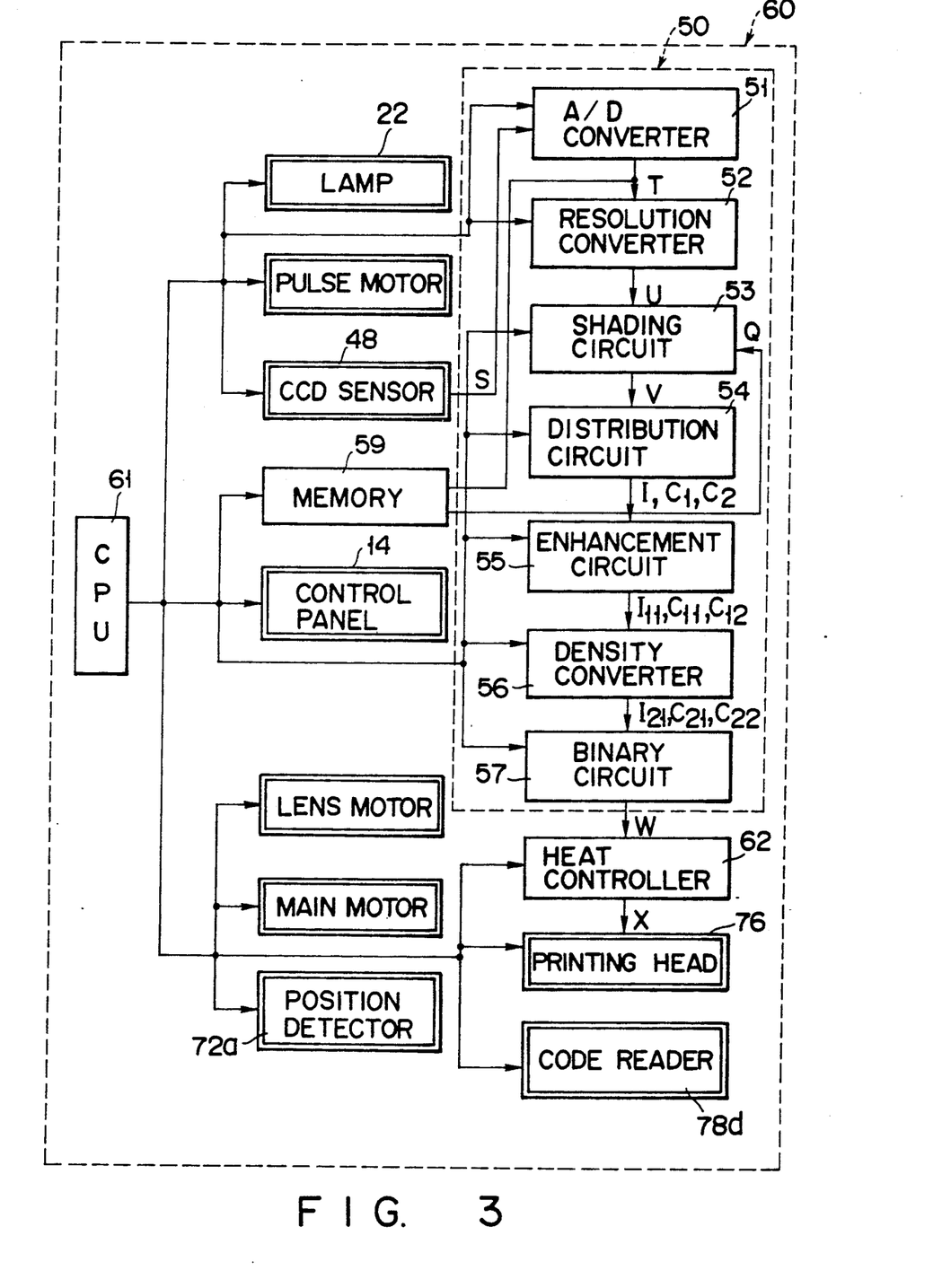
FIG. 3 is a block circuit diagram showing a system controller which is incorporated in the image-forming apparatus and which drives or controls units, and mechanisms for the production of printing.

The image-processing section 50 and the system controller 60 will now be detailed, with reference to FIG. 3.

The image-processing section 50 includes: an A/D converter 51 for converting an analog signal into a digital signal; a resolution converter 52 for matching the resolutions of the CCD sensor 48 and head 76 to each other; a shading circuit 53 for correcting an intensity variation which an image signal S undergoes due to the characteristics of the CCD sensor 48; an intensity chromatic difference distribution circuit 54 for performing a predetermined arithmetic operation on the basis of the image signal S and separating the image signal S into an intensity signal I, a primary chromatic difference signal C1 and a secondary chromatic difference signal C2; an enhancement circuit 55 for enhancing the image quality, including edge enhancement and character recognition; a chromatic density converter 56 for converting the image signal S into a chromatic density signal in accordance of which the chromatic density of ink is determined for printing; a binary circuit 57 for determining the tone reproduction on the basis of the image signal S; a memory 59 for storing reference data regarding reflected light L; etc.

The system controller 60 has a CPU 61. This CPU 61 includes a main control unit for controlling the units and mechanisms incorporated in the apparatus 2; and I/O ports (or I/O lines) through which the main control unit supplies signals to the units and mechanisms and receives signals therefrom.

In FIG. 3, the names of appropriate controllers should be indicated within the respective blocks shown with double sets of lines. However, since such controllers are integrally incorporated in the CPU 61, the names of units or mechanisms connected to such controllers are indicated. For example, "LAMP" in FIG. 3 should be interpreted as a controller connected to the lamp 22, and this controller is not an independent one but is incorporated in the CPU 61.

A description will now be given of the ink ribbon 78a employed by the image-forming apparatus 2, with reference to FIG. 4A.

Figure 4A:
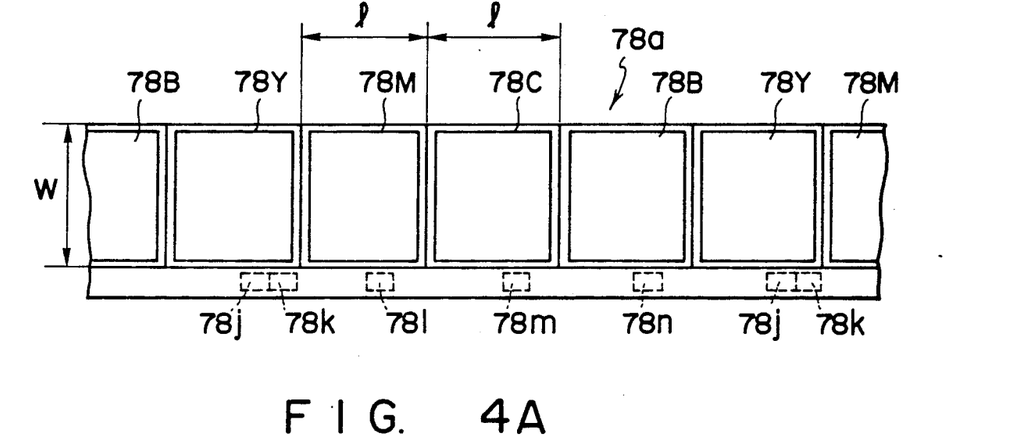
FIG. 4A is a plan view of an ink ribbon employed by the image-forming apparatus.

As is shown in FIG. 4A, the ink ribbon 78a has a yellow-ink portion 78Y, a magenta-ink portion 78M, a cyan-ink portion 78C, and a black-ink portion 78B. The yellow, magenta and cyan colors are complementary colors which respectively correspond to the red (R), green (G) and blue (B) colors (the three primary colors of light) obtained by decomposing a white light beam. The black color is used for compensating for the ink density corresponding to the black color which is to be removed by under color removal (UCR) to be mentioned later.

When the ink ribbon 78a is used, the yellow-ink portion 78Y, the magenta-ink portion 78M, the cyan-ink portion 78C and the black-ink portion 78B have to be brought into contact with a paper sheet P. When an A3 paper sheet is employed, use is made of an ink ribbon 78a whose width W is 297 mm or more, and when an A4 sheet is employed, use is made of an ink ribbon 78a whose width W is 210 mm or more. The length l of each color portion (78Y, 78M, 78C, 78B) is 420 mm or more in the case of the ink ribbon 78a used with the A3 paper sheet, and is 297 mm or more in the case of the ink ribbon 78a used with the A4 paper sheet. In the case where the A4 paper sheet is inserted into the apparatus from a longer side, not from a shorter side, the ink ribbon 78a adapted for the A3 paper sheet may be used.

The ink ribbon 78a has ink codes 78j, 78k, 78l, 78m and 78n, each of which is a bar code, a combination of punch holes, or the like. These ink codes are arranged on one side portion of the ink ribbon 78a such that ink codes 78j and 78k correspond in position to yellow-ink portion 78Y, ink code 78l corresponds in position to magenta-ink portion 78M, ink code 78m corresponds in position to cyan-ink portion 78C, and ink code 78n corresponds in position to black-ink portion 78B. In the present embodiment, ink code 78j indicates the start of the first ink portion (in this case, yellow-ink portion 78Y) of one of the ink portion groups (each group is made up of: one yellow-ink portion 78Y, one magenta-ink portion 78M, one cyan-ink portion 78C and one black-ink portion 78B that are sequentially arranged), and ink codes 78k, 78l, 78m and 78n indicate the positions of the ink portions 78Y, 78M, 78C and 78B, respectively.

Figure 4B:
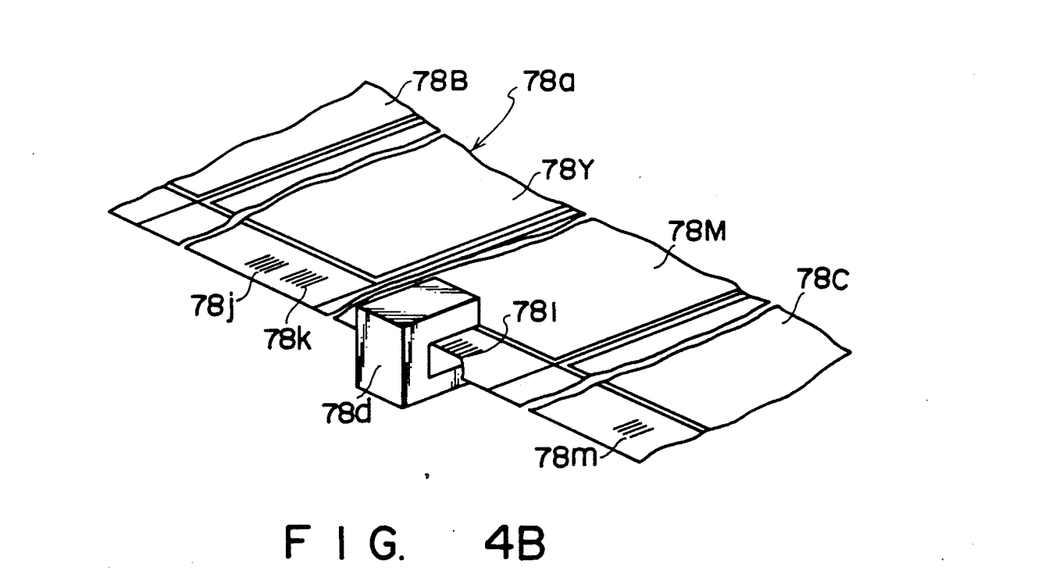
FIG. 4B is a perspective view illustrating how the ink ribbon is positioned.

As is shown in FIG. 4B, the ink codes 78j–78n are read by a code reader 78d incorporated in the ribbon cartridge 78, for the positioning of the ink ribbon 78a or for the selection of a designated ink color portion.

Next, a description will be given of the operation of the image-forming apparatus of the above-embodiment.

A document D is mounted on the document table 10 and is then covered with the document cover 12, whereby the document D is pressed against the document table 10. When a printing start signal is entered from the print key 14a of the control panel 14, a linear region on the document D is irradiated with light, which is emitted from the lamp 22 and guided to the document D by the reflectors 24 and 26. It should be noted that the lamp 22 is lit only when the information shown on the document D is being read, in other words, only when the first carriage 20 is being advanced.

The light L reflected by the document D passes through the slit defined by the reflectors 24 and 26, and is then directed to the primary mirror 28. After being reflected by the primary mirror 28, secondary mirror 32 and tertiary mirror 34, the light L is guided into the reading unit 40. Inside this reading unit 40, the light L is converged by the lens 42 and then passes through the filter 44. After being reflected twice by the folding mirror 46, the light L is focused on the CCD sensor 48. By this CCD sensor 48, the light L is converted into electric signals. Since the first and second carriages 20 and 30 are moved in the sub scanning direction at their respective speeds, the information shown on the document D is successively read from the linear region until the information on the entire document D is read. Therefore, the light representing the information read from the document D is successively guided to the CCD sensor 48, for photoelectric conversion.

In the image-forming apparatus 2 of the present invention, the lens 42 can be moved by a lens motor and a lens motor driver (shown in FIG. 3) such that the lens 42 is positioned to provide a desirable magnification. In other words, the distance between the lens 42 and the CCD sensor 48 is changed in accordance with the position of the lens 42. Since the size of the cross section of the light L falling on the CCD sensor 48 is changed, the magnification of an image to be reproduced can be changed, accordingly. When the lens 42 is moved, the focal point of the lens 42 deviates from the light-receiving surface of the CCD sensor 48. In order to correct this deviation, the folding mirror 46 is designed to move together with the lens 42.

In association with the image-reading operation mentioned above, the paper supply rollers 81 draw one paper sheet P into the apparatus 2 from either the cassette 82 or the stack bypass 85. The paper sheet P is conveyed toward the head 76 by the conveyance rollers 84a, while being guided by the paper guide 84. The leading end of the paper sheet P is inserted into the space Z within the gripper 72, and in this state the paper sheet P is set onto the drum 70 in accordance with the rotation of the drum 70 (which is rotated by a main motor control circuit [not shown] connected to the CPU 61). By the pressing rollers 74, the paper sheet P is prevented from separating from the drum 70 or slipping on the drum 70. The paper sheet P on the drum 70 moves with the rotation of the drum 70, until the gripper 72 is sensed by the gripper detector 75. When the rotation of the drum 70 stops, the leading end of the paper sheet P is at the printing start position located in opposition to the head 76. In this state, the paper sheet P on the drum 70 waits for a printing operation to be started.

A description will now be given, with reference to FIGS. 5A to 5D, as to how data is entered when one of the operating modes, for example, a masking mode, a trimming mode, an edit mode or a photograph mode is selected.

In the description below, it is assumed that the trimming mode is selected and that the number of areas which can be designated by the user is two. What is displayed on the display device 14e in each step is not illustrated in the drawings.

Figure 5A:
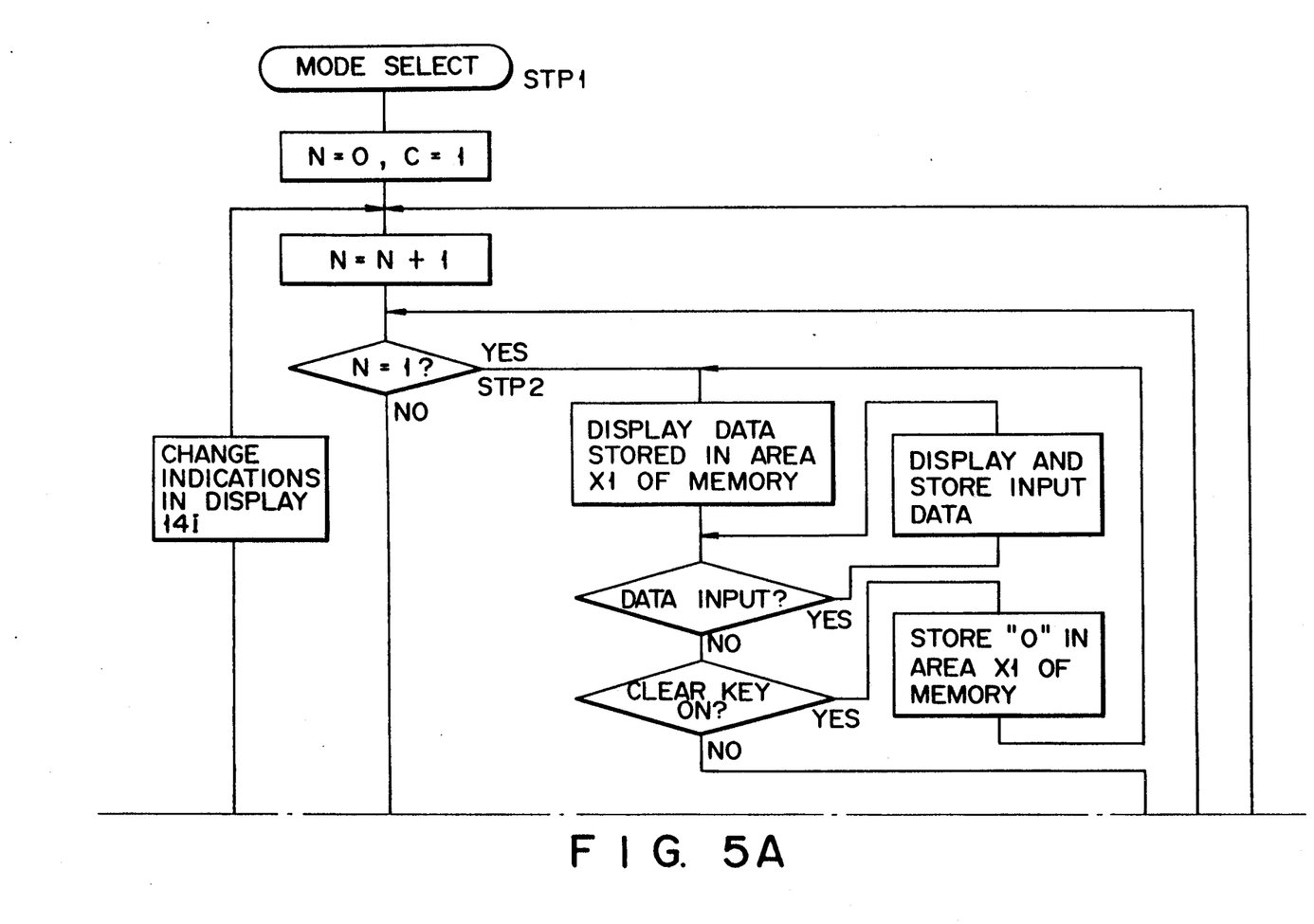
FIGS. 5A to 5D are flowcharts illustrating how the image-forming apparatus is operated in a given mode.

First, the user switches on the trimming mode. (STP1)

In response to this operation, the display device 14e displays "A:X1=?" and the display 14i lights up an area A. Then, the user designates X1-coordinate data (a), which denotes a trimming starting location in the first trimming area A, by use of the number keys a-j, and enters it by pressing the enter key 14h. (STP 2)

In response to this, the display device 14e displays "A:X1=a, Y1=?". Then, the user designates Y1-coordinate data (b), which denotes a trimming starting location in the first trimming area A, by use of the number keys a-j, and enters it by pressing the enter key 14h. (STP 3)

Figure 5B:
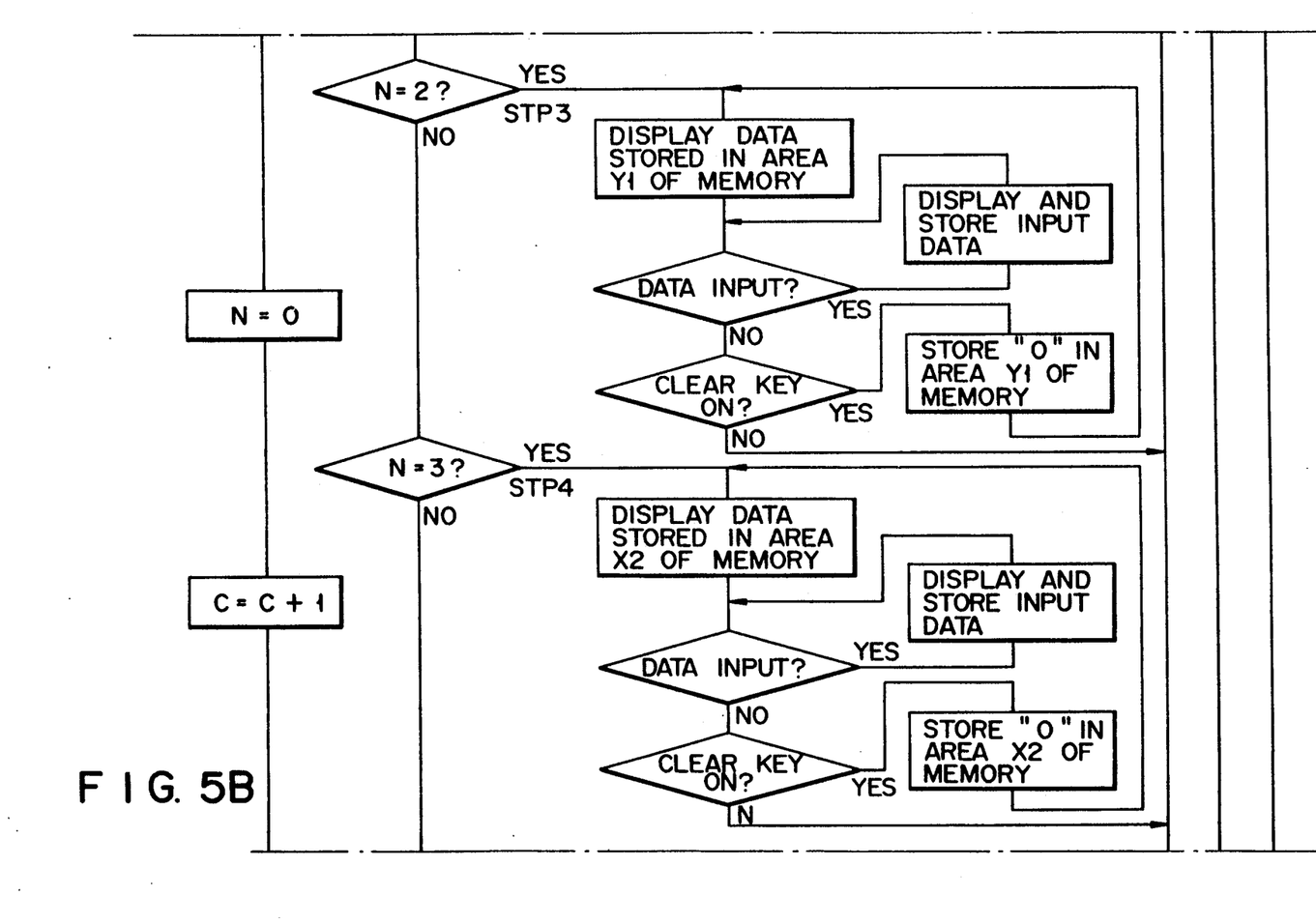

In response to this, the display device 14e displays "A:X1=a, Y1=b, X2=?". Then, the user designates X2-coordinate data (c), which denotes a trimming closing location in the first trimming area A, by use of the number keys a-j, and enters it by pressing the enter key 14h. (STP 4)

In response to this, the display device 14e displays "A:X1=a, Y1=b, X2=c, Y2=?". Then, the user designates Y2-coordinate data (d), which denotes a trimming closing location in the first trimming area A, by use of the number keys a-j, and enters it by pressing the enter key 14h. (STP 5)

Figure 5C:
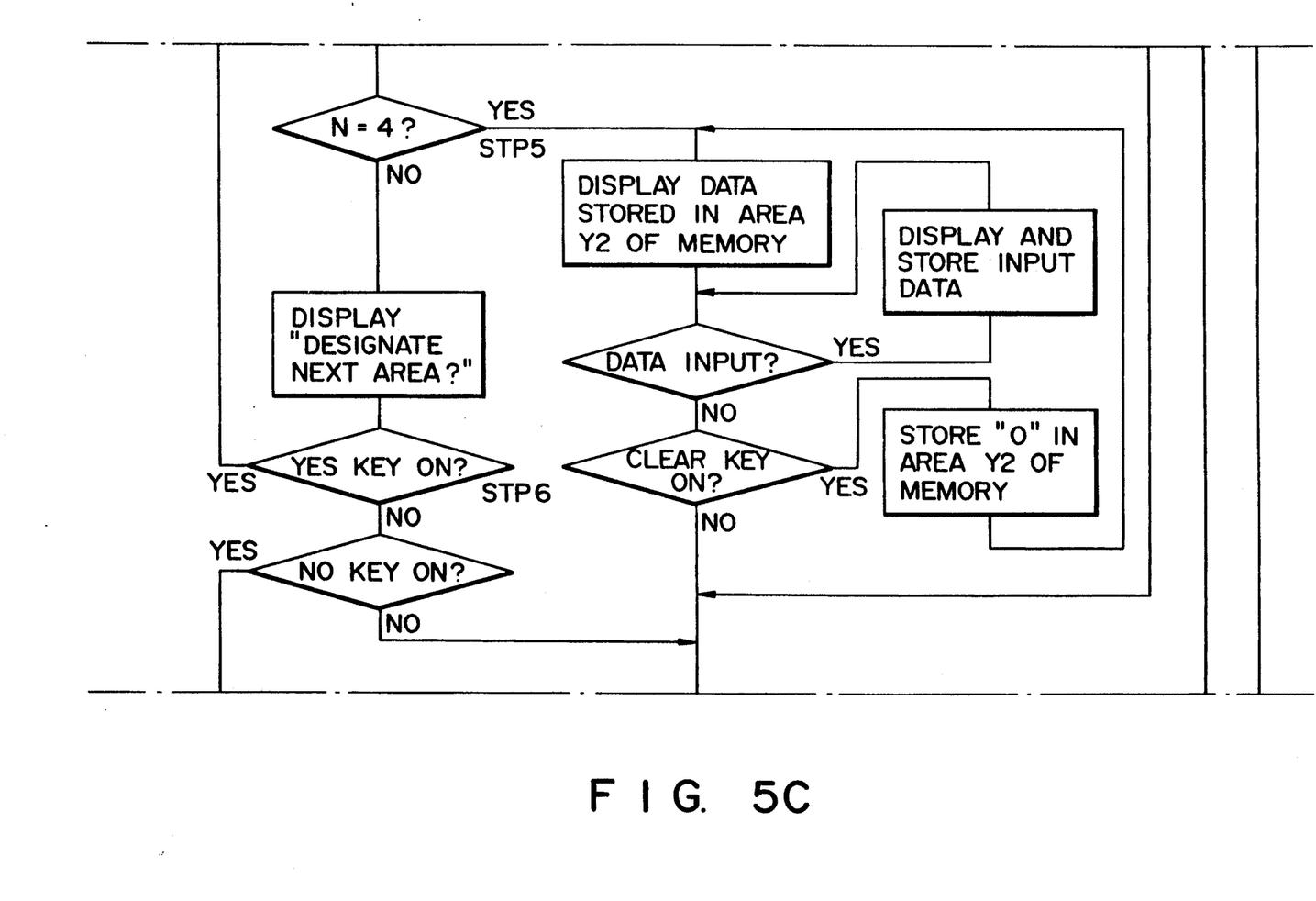

In response to this, the display device 14e displays "A:X1=a, Y1=b, X2=c, Y2=d". By following the above procedures, the first area to be trimmed is designated. When the first area has just been designated, the display device 14e displays "DESIGNATE NEXT AREA?". (STP 6)

In response to this question, the user depresses either the "YES" key 14y or the "NO" key 14n, and then performs the next operation in accordance with the message displayed on the display device 14e. Namely, when the "YES" key 14y is depressed, an instruction "SET AREA B" is displayed in the display 14e and the area B in the display 14i is lit up. In contrast, when "NO" key 14n is depressed, an instruction "DEPRESS PRINT KEY" is displayed.

As mentioned above, the control panel 14 has F.C. (function) clear key 14b and clear key 14c which allow the user to make corrections to the data he or she enters. Therefore, the user can easily correct any error which he or she has made in any of STPs 2-5 (or in STPs 1-6). More specifically, if the user notices during data input that an error has been made, he or she operates clear key 14c to correct the data. If, on the other hand, the user notices an error only after the enter key 14h has been depressed, he or she can then use F.C. clear key 14b to make the required correction.

Figure 5D:
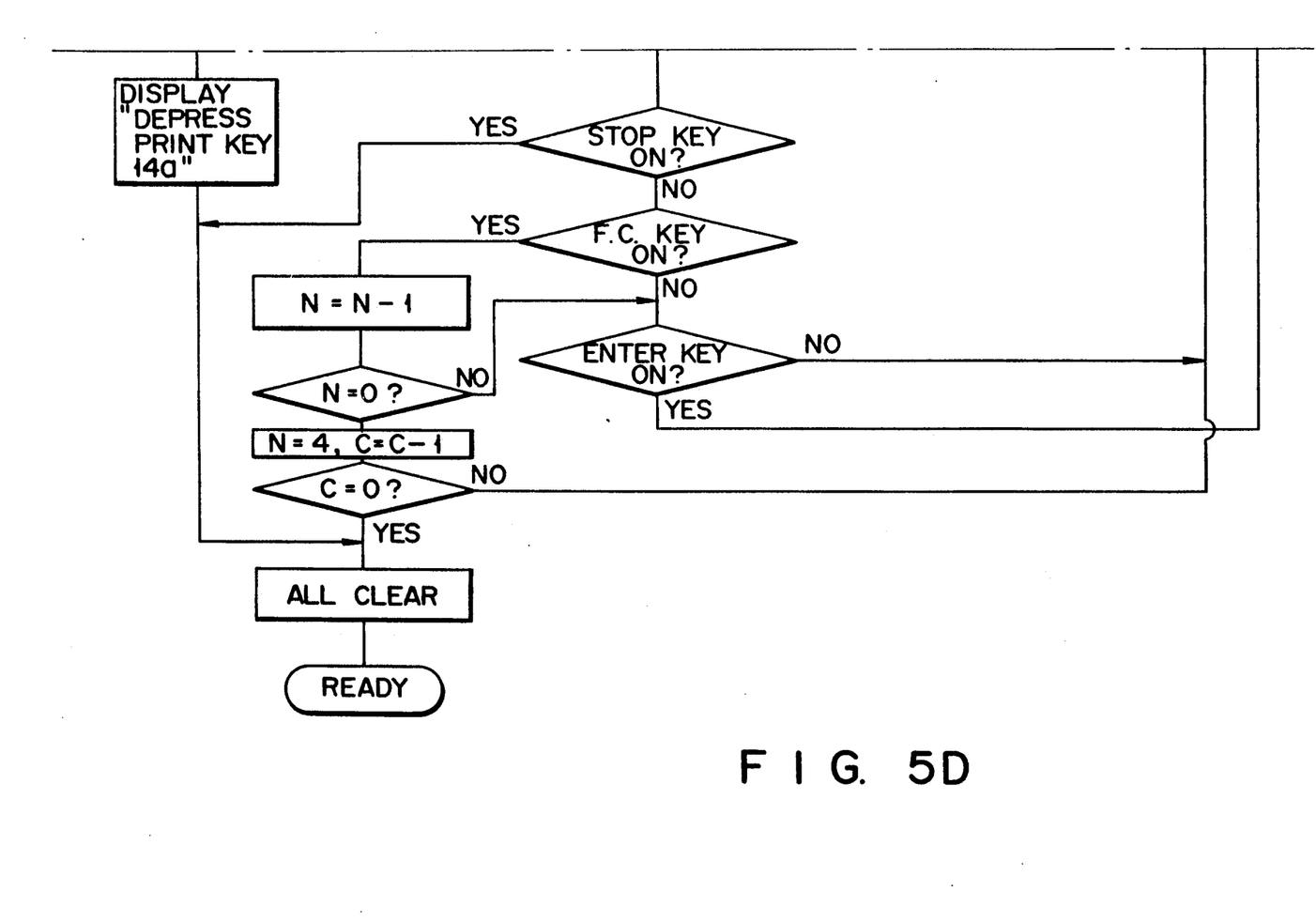

Let it be assumed that mistaken Y2-coordinate data (d) is designated in STP 5. If the user has not yet depressed the enter key 14h when he or she becomes aware of a mistake, the mistaken data can be corrected by depressing clear key 14c and representing a new data to operate number keys a-j. If the user has already depressed the enter key 14h, then he or she depresses F.C. clear key 14b, to thereby start STP 5 from the beginning.

If the stop key 14d is depressed in any of the steps, the presently-set printing mode and printing conditions are canceled, and the apparatus 2 is brought back into a ready state (the state before the selection of an operating mode).

In this embodiment, F.C. clear key 14b is provided independently of the other keys. However, the F.C. clear key 14b may be allotted to some other key provided on the control panel 14.

The light L focused on the CCD sensor 48, having three elements aligned in the main scanning direction, is decomposed into chromatic components made up of a red (R) component, a green (G) component and a blue (B) component. These chromatic components are converted into image signals by elements 48r, 48g and 48b, respectively. For the sake of simplicity, the image signals output from elements 48r, 48g and 48b will be hereinafter referred to as image signals Sr, Sg and Sb since they correspond to the red (R), green (G) and blue (B) chromatic components, respectively.

The image signals Sr, Sg and Sb are supplied to the image-processing section 50, and are converted in this section into printing signals Xr, Xg and Xb, respectively. The description will be given as to how this conversion is performed.

In the image-processing section 50, the image signals Sr, Sg and Sb are first supplied into the A/D converter 51, by which they are converted into digital signals. Since the image signals Sr, Sg and Sb are processed in the same manner, they will be collectively referred to as image signal S in the description below, and the signal S will be indicated "T", to discriminate it from the signal S.

The image signal T output from the A/D converter 51 is stored in the memory 59. It is also supplied to the resolution converter 52, by which the resolution of the CCD sensor 48 and that of the head 76 are matched to each other. The image signal U (the image signal output from the resolution converter 52 will be indicated with "U", so as to discriminate it from the image signal T mentioned above) is supplied to the shading circuit 53. In this shading circuit 53, an intensity variation which the image signal U may undergo is corrected on the basis of the data read out of the memory 59. More specifically, the intensity data deriving from the reference light reflected by the white plate 18 and the intensity data included in the image signal U are compared with each other, and an intensity correction signal Q, stored in the memory 59 beforehand, is selected, for shading. The image signal V subjected to this shading (the image signal output from the shading circuit 53 will be indicated with "V") is supplied to the intensity and chromatic-difference distribution circuit 54. By this circuit 54, the image signal V is separated into an intensity signal I, a primary chromatic-difference signal C1 and a secondary chromatic-difference signal C2. These signals I, C1 and C2 are supplied to the enhancement circuit 55, so as to enhance the image quality.

The signals I11, C11 and C12 (the signals output from the enhancement circuit 55 will be indicated with "I11", "C11" and "C12", so as to discriminate them from the signals I, C1 and C2 mentioned above) are supplied to the chromatic density converter 56. This converter 56 performs color conversion; that is, it converts the signals I11, C11 and C12 into signals I21, C21 and C22, respectively. By this color conversion, chromatic density of ink is determined, and the density data regarding complementary colors are incorporated in the signals.

Further, the chromatic density converter 56 performs under color removal (UCR). By this under color removal, the amount of ink which corresponds to the black color obtained by superposing the red (R), green (G) and blue (B) components on one another is reduced. When a black color is produced by superposing cyan (C), magenta (M) and yellow (Y) inks on one another, the image to be produced with the black color will be blurred on a paper sheet. This is the reason why the under color removal has to be performed. The ink density which corresponds to the black color and which is removed by the under color removed is represented by a BK signal. This BK signal is temporarily stored, and is used for the compensation of a black color after a printing operation based on the red, green and blue inks is performed.

After the above-mentioned color conversion and under color removal, the signals I21, C21 and C22 output from the chromatic density controller 56 are supplied to the binary circuit 57. This binary circuit 57 serves as a dot tone converter, and converts the signals I21, C21 and C22 into a binary signal W including tone information. The binary signal W obtained by this conversion is supplied to a heat-controlling circuit 62, which controls the temperature of the head 76. By the heat-controlling circuit 62, the binary signal W is converted into a printing signal X used for actuating the head 76. The printing signal X is supplied to the head 76, together with a copy start signal.

The printing signal X is supplied to the corresponding portion or area of the head 76. Although not shown, the head 76 contains a dot heater array. By this dot heater array, that area of the head 76 to which the printing signal X is supplied is actuated, and the corresponding ink ribbon 78a is heated. Accordingly, the ink on the ink ribbon 78a is melted and the image information corresponding to the printing signal X is printed. As described above, the printing signal X is produced for each color component. That is, printing signals Xr, Xg and Xb are produced and supplied to the head 76, and the printing operation is repeated with respect to all color components. It should be noted that the drum 70 holding a paper sheet P thereon is rotated by the number of times which corresponds to the number of inks, and that the ink of one color is transferred from the ink ribbon to the paper sheet P while the drum 70 makes one rotation. Thus, the image-forming apparatus requires only on one head 76.

The chromatic components of the image information are transferred onto the paper sheet P in accordance with the manner in which the ink portions are arranged in each ink portion group, e.g., in the order of yellow ink 78Y, magenta ink 78M, cyan ink 78C and black ink 78B.

More specifically, the yellow ink 78Y is transferred onto the paper sheet P when the drum 70 makes the first rotation, the magenta ink 78M is transferred when the drum 70 makes the second rotation, the cyan ink 78c is transferred when the drum 70 makes the third rotation, and finally the black ink 78B is transferred when the drum 70 makes the fourth rotation.

In the above manner, the inks of four colors are transferred onto the paper sheet one upon another. As a result, the image information shown on the document D is formed on the paper sheet P as a multi-color image.

A description will now be given as to how the ink ribbon 78a is positioned with reference to the drum 70 and the head 76 when chromatic components are superposed on the paper sheet P.

As mentioned above, the drum 70 comes to a halt, waiting for the start of a printing operation, when the leading end of the paper sheet P held o the drum 70 reaches the printing start position. In the meantime, the ink ribbon 78a stops its movement when the first ink portion (e.g., yellow-ink portion 78Y) corresponds in position to the printing start position, because ink codes 78j and 78k are provided for that first ink portion. With the leading end of the paper sheet P and the first ink portion of the ink ribbon 78a being located at the printing start position, printing signals Xr, Xg and Xb are sequentially supplied to the head 76, together with a copy start signal.

When the copy start signal is supplied, the ink ribbon 78a is moved at the predetermined speed such that the movement of the ink ribbon 78a is associated with the rotation of the drum 70. In this state, images shown on the document D are sequentially formed on the paper sheet P, using the first color. After the image formation using the first color is completed, the head-releasing mechanism 76a is actuated, so as to provide a sufficiently wide gap between the drum 70 and the head 76.

The drum 70 continues to rotate until the gripper detector 75 detects the gripper 72, i.e., the leading end of the paper sheet P, once again. When the gripper 72 is detected, the drum 70 comes to a halt, with the leading end of the paper sheet P situated at the printing start position, and waits for the start of a printing operation using the second color. In the meantime, the ink ribbon 78a is wound around the take-up roller 78c, and stops when the code reader 78d detects ink code 78l. As a result, the ink ribbon 78a stops, with the second ink portion (e.g., the magenta-ink portion 78M) situated at the printing start position. In this manner, the second color portion of the ink ribbon 78a is positioned.

When a printing start signal is issued by the CPU 61, the image shown on the document D are transferred onto the paper sheet P, using the second color.

In the above manner, the inks of four colors are transferred onto the paper sheet P, to thereby produce a multi-colored image on the paper sheet P.

After the inks of four colors are transferred onto the paper sheet P, the head-releasing mechanism 76a moves the head 76 away from the drum 70, so that the head 76 and the drum 70 are released from the pressed condition. In this state, the drum 70 is rotated in the opposite direction. Simultaneously, the paper sheet P is released from the gripper 72 and therefore from the drum 70, and is discharged onto the tray 86a.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image forming apparatus for forming an image on an image bearing member, comprising:
    means for inputting a plurality of imaging-condition data including at least first, second and third operation data inputted in a predetermined order to form the image on the image bearing member, said second operation data being inputted immediately after the first operation data, and the third operation data being inputted immediately after the second operation data;
    means for storing the operation data inputted by the inputting means;
    means for designating a correction of the second operation data when the third operation data is being inputted by the inputting means and designating a correction of the first operation data when the second operation data is being inputted by the inputting means, said designating means having means for undoing a data-input state in opposite order to said predetermined order step by step;
    means for reading the second operation data when the third operation data is being inputted by the inputting means and reading the first operation data when the second operation data is being inputted by the inputting means;
    means for displaying the second operation data when the third operation data is being inputted by the inputting means and displaying the read first operation data when the second operation data is being inputted by the inputting means, thus permitting the second and third operation data to be corrected by means of the inputting means; and
    means for forming the image on the image bearing member based on the plurality of operation data stored in the storing means.

2. An image forming apparatus comprising:
    means for deriving image information from an object and producing an image signal in accordance with the image information;
    means for entering imaging-condition data used for processing the image signal, by following an input procedure including a plurality of steps;
    means for designating correction of the imaging-condition data, said designating means having at least two data entry modes which are selectable in a predetermined cycle and each of which allows entry of at least first and second imaging-condition data in a predetermined order, said designating means enabling correction of the first imaging-condition data when said first designating means is turned on during entry of the second imaging-condition data, and said first designating means being switched from one data entry mode to another data entry mode and enabling correction of the second imaging-condition data entered in said another data entry mode when said designating means is turned on during entry of the first imaging-condition data in said one data entry mode;
    means for processing the image signal in accordance with the imaging-condition data entered by the entering means and producing the processed image signal as an image output; and
    means for visualizing the image information in accordance with the image output and transferring the visualized image information onto a given material.

3. An image forming apparatus according to claim 1, wherein said designating means includes a key for allowing correction of the operation data included in the inputted imaging-condition data, said key allowing correction of the second operation data when the designating means is turned on immediately after the input of the third operation data, and allowing correction of the first operation data when the designating means is turned on immediately after the input of the second operation data.

4. An image forming apparatus for forming an image on an image bearing member, comprising:
    means for inputting a plurality of imaging-condition data including at least first, second and third operation data inputted in a predetermined order to form an image on the image bearing member, said second operation data being inputted immediately after the first operation data, and the third operation data being inputted immediately after the second operation data;
    means for storing the operation data inputted by the inputting means;
    first designating means for designating correction of the second operation data when the third operation data is being inputted by the inputting means and designating a correction of the first operation data when the second operation data is being inputted by the inputting means, said first designating means having means for undoing a data-input state in opposite order to said predetermined order step by step;
    second designating means for designating the correction of all of the plurality of operation data when the inputting means inputs all of the plurality of operation data;
    third designating means for setting the image forming apparatus in an initial state where no operation data is input;
    means for reading the operation data from the storing means in response to one of the first to third designating means, so as to correct the operation data by means of the inputting means;
    means for displaying the read operation data, so as to permit the read operation data to be corrected by means of the inputting means; and
    means for forming the image on the image bearing member based on the plurality of operation data stored in the storing means.

5. An image forming apparatus according to claim 4, wherein said first designating means includes a key for allowing correction of the operation data included in the inputted imaging-condition data, said key allowing correction of the second operation data when the first designating means is turned on immediately after the input of the third operation data, and allowing correction of the first operation data when the first designating means is turned on immediately after the input of the second operation data.

6. An image forming apparatus according to claim 4, wherein:
    said first designating means has at least two data entry modes which are selectable in a predetermined cycle and each of which allows entry of at least first and second imaging-condition data in a predetermined order;
    said first designating means enabling correction of the first imaging-condition data when said first designating means is turned on during entry of the second imaging-condition data; and said first designating means being switched from one data entry mode to another data entry mode and enabling correction of the second imaging-condition data entered in said another data entry mode when said first designating means is turned on during entry of the first imaging-condition data in said one data entry mode.

* * * * *